United States Patent [19]

Inagaki et al.

[11] Patent Number: 5,182,186
[45] Date of Patent: Jan. 26, 1993

[54] OPTICAL INFORMATION RECORDING MEDIUM

[75] Inventors: Yoshio Inagaki; Keiichi Adachi, both of Minami-ashigara; Masao Yabe, Fujinomiya, all of Japan

[73] Assignee: Fuji Photo Film Co., Ltd., Kanagawa, Japan

[21] Appl. No.: 496,320

[22] Filed: Mar. 20, 1990

Related U.S. Application Data

[63] Continuation-in-part of Ser. No. 251,137, Sep. 29, 1988, abandoned.

[30] Foreign Application Priority Data

Sep. 29, 1987 [JP] Japan .................. 62-245288

[51] Int. Cl.⁵ .......................... G03C 1/72; G11B 7/24
[52] U.S. Cl. .............................. 430/270; 430/495; 430/945; 346/135.1
[58] Field of Search ............ 430/270, 495, 945; 346/135.1

[56] References Cited

U.S. PATENT DOCUMENTS

| | | | |
|---|---|---|---|
| 4,626,496 | 12/1986 | Sato | 430/270 |
| 4,652,514 | 3/1987 | Abe et al. | 430/343 |
| 4,713,314 | 12/1987 | Namba et al. | 430/270 |
| 4,719,170 | 1/1988 | Schrott et al. | 430/270 |
| 4,730,902 | 3/1988 | Suzuki et al. | 546/2 |
| 4,735,889 | 4/1988 | Namba et al. | 430/273 |
| 4,761,181 | 8/1988 | Suzuki | 549/3 |
| 4,763,966 | 8/1988 | Suzuki et al. | 350/1.1 |
| 4,767,571 | 8/1988 | Suzuki et al. | 430/616 |
| 4,791,023 | 12/1988 | Suzuki et al. | 428/336 |
| 4,851,322 | 7/1989 | Inagaki et al. | 430/270 |
| 4,885,228 | 12/1989 | Inagaki et al. | 430/270 |
| 4,904,574 | 2/1990 | Suzuki | 430/372 |
| 4,913,846 | 4/1990 | Suzuki et al. | 252/567 |
| 4,914,001 | 4/1990 | Inagaki et al. | 430/270 |
| 4,921,317 | 5/1990 | Suzuki et al. | 350/311 |
| 4,968,593 | 11/1990 | Inagaki et al. | 430/495 |
| 4,981,773 | 1/1991 | Suzuki | 430/372 |
| 4,994,343 | 2/1991 | Inagaki et al. | 430/270 |
| 4,999,281 | 3/1991 | Inagaki et al. | 430/495 |
| 5,024,923 | 6/1991 | Suzuki et al. | 430/372 |

FOREIGN PATENT DOCUMENTS

| | | |
|---|---|---|
| 0147083 | 7/1985 | European Pat. Off. . |
| 147083A | 3/1986 | European Pat. Off. . |
| 0182946 | 6/1986 | European Pat. Off. . |
| 0304050 | 2/1989 | European Pat. Off. . |
| 0347183 | 12/1989 | European Pat. Off. . |

OTHER PUBLICATIONS

Patent Abstracts of Japan, vol. 9, No. 50, (p-339)(1773), Mar. 5, 1985, JP-A-59188854.

*Primary Examiner*—Lee C. Wright
*Attorney, Agent, or Firm*—Birch, Stewart, Kolasch & Birch

[57] ABSTRACT

An optical information recording medium for carrying out recording, readout or erasing by laser beam which comprises a support having carried thereon a recording layer containing dye(s) represented by the general formula (I):

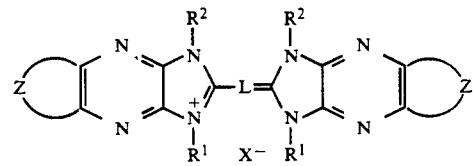

wherein $R^1$ and $R^2$ independently represent substituted or unsubstituted alkyl groups, substituted or unsubstituted alkenyl groups, or substituted or unsubstituted aryl groups, L represents a substituted or unsubstituted methine group, or a linking group formed by linkage of 3, 5 or 7 substituted or unsubstituted menthine groups through conjugated double bonds, Z represents an atomic group for completing an aromatic ring optionally having substituent(s), and $X^-$ represents a monovalent or divalent anion for neutralization of electron charge of the cationic part.

The present optical information recording media have adequate recording characteristics and have a dye recording layer which is capable of maintaining the characteristics over a long period and thus is excellent in stability.

19 Claims, No Drawings

OPTICAL INFORMATION RECORDING MEDIUM

This application is a continuation-in-part of application Ser. No. 07/251,137 filed on Sep. 29, 1988, now abandoned.

FIELD OF THE INVENTION

The present invention relates to an optical information recording medium of heat mode type having an organic dye thin film wherein recording and readout are carried out by causing state change by high density energy beam.

BACKGROUND OF THE INVENTION

Heretofore, information recording media wherein recording and readout of information are carried out by irradiating a rotating disc-shaped information recording medium with a laser beam have been known. As recording layers in these information media, those wherein metals having low melting points and dielectric substances are used are proposed. However, these recording layers have disadvantages such as poor preservability, low separating ability, low recording density and high manufacturing cost. Recently, it has been proposed and practiced that dye films whose physical properties may be changed with light of relatively long wavelength are used in recording layers. However, dyes which have absorption bands in long wavelength generally have such problems that they are low in stability against heat and light. Thus, it is the present state of the art that recording layers having recording characteristics which are stable over a long period have not yet been developed.

On the other hand, compact disc (CD) has been widely and practically used for readout of audio such as music.

Compact disc is generally composed of a plastic disc-shaped transparent support wherein pits containing EFM (Eight to Fourteen Modulation) digital audio signal information such as CD format signal have been formed in advance, a reflective thin film made of Al, etc. and a protective film, provided thereon respectively. Readout of the information from CD is carried out by irradiation of the optical disc with a laser beam. CD format signal or the like is read out by change in reflectance owing to the presence or absence of pits.

CD is required based on CD standard to have a recording time of a maximum 74 minutes in the range of a signal surface inside diameter of 45 mm and a signal surface outside diameter of 116 mm and in a pit width of 0.8 micrometer and a track pitch of 1.6 micrometers when recording is carried out by rotating the CD at a constant linear velocity of 1.2 to 1.4 m/sec. Heretofore, such compact discs for audio have been those only for readout wherein pits had been formed in advance on the support, and thus have had a disadvantage that recording, editing and the like of information cannot be made. Therefore, development of DRAW (Direct Read After Write, writable) type CD has been desired.

Further, DRAW type optical disc for CD-ROM (Read Only Memory) or CD-I (Interactive) has been desired in files such as various documents, data and still pictures.

However, since writable optical information recording media having as a recording layer a dye thin film which have hitherto been known have a low reflectance for the dye thin film, even if information could be recorded therein, the information could not be read out by commercially available CD players in which a high reflectance is required.

As for optical disc for recording CD format signal, there have been proposed an optical disc which has a recording layer comprising a dye, a dye composition or the like and wherein recording of CD format signals is made, and a method for recording optical information using the optical disc (J.P. KOKAI Nos. 61-237239, 61-239443, 62-14344 and 62-14345). However, these optical discs have been practically insufficient in recording sensitivity, readout sensitivity or the like.

SUMMARY OF THE INVENTION

Thus, an object of the present invention is to provide optical information recording media having adequate recording characteristics and having a dye recording layer which is capable of maintaining the characteristic over a long period and thus excellent in stability.

Another object of the present invention is to provide an optical information recording medium wherein CD format signals readable by commercially available CD players can be recorded.

The above objects of the present invention have been accomplished by an optical information recording medium for carrying out recording, readout or erasing by laser beam which comprises a support having carried thereon a recording layer containing dye(s) represented by the following general formula (I):

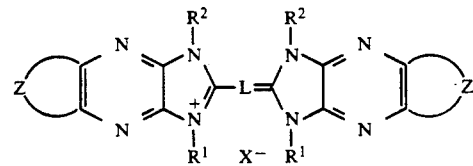

General formula (I)

wherein $R^1$ and $R^2$ independently represent alkyl groups, alkenyl groups or aryl groups, L represents a methine group, or a linking group formed by linkage of 3, 5 or 7 methine groups through conjugated double bonds, Z represents an atomic group for completing an aromatic ring, and $X^-$ represents an anionic ion.

In the general formula (I), $R^1$, $R^2$ and Z may have substituent(s). Preferred ones among the substituents are those having a hydrophobic parameter $\pi$ ranging from $-0.5$ to 15 as proposed by C. Hansch et al. Hydrophobic parameter can be calculated according to the following publications:

1) C. Hansch et al., J. Med. Chem. 16, 1207 (1973)
2) C. Hansch et al., ibid. 20, 304 (1977)

Preferred among the groups represented by $R^1$ or $R^2$ are substituted or unsubstituted phenyl groups, substituted or unsubstituted lower alkyl groups (having 1 to 8 carbon atoms), or substituted or unsubstituted lower alkenyl group (having 2 to 8 carbon atoms), and these substituents may be those having a hydrophobic parameter $\pi$ ranging from $-0.5$ to 15 as proposed C. Hansch. Particularly preferred substituents when $R^1$ or $R^2$ has substituent(s) are halogen atoms (F, Cl, Br, I), substituted or unsubstituted phenyl groups (for example, phenyl, m-chlorophenyl, p-methylphenyl, etc.), alkylthio groups (for example, methylthio, butylthio, etc.) and substituted or unsubstituted phenylthio groups (for example, phenylthio, p-chlorophenylthio, m-methylphenylthio, etc.).

Particularly preferred among the groups represented by $R^1$ or $R^2$ are unsubstituted alkyl groups having 2 to 8 carbon atoms or unsubstituted alkenyl groups having 2 to 8 carbon atoms, and most preferred ones among them are those wherein $R^1$ and R2 are identical.

Examples of the atomic group represented by Z include atomic groups for completing a benzene ring, a naphthalene ring or an anthracene ring, and preferred examples thereof are atomic groups for completing a benzene ring or a naphthalene ring, and these atomic groups may have substituent(s) above-described as substituents on $R^1$ or $R^2$. Particularly preferred substituents when Z has substituent(s) include halogen atoms (F, Cl, Br, I), substituted or unsubstituted phenyl groups (for example, phenyl, m-chlorophenyl, p-methylphenyl, etc.), alkylthio groups (for example, methylthio, butylthio, etc.), substituted or unsubstituted phenylthio groups (for example, phenylthio, p-chlorophenylthio, m-methylphenylthio, etc,), substituted or unsubstituted alkyl groups (for example, methyl, trifluoromethyl, tert-amyl, etc.), a cyano group, alkoxycarbonyl groups (for example, propoxycarbonyl, butoxycarbonyl, benzyloxycarbonyl, decyloxycarbonyl, 2-ethylhexyloxycarbonyl, etc.), and alkyl- or arylsulfonyl groups (for example, butanesulfonyl, phenylsulfonyl, octanesulfonyl, etc.).

Particularly preferred among the atomic groups represented by Z are atomic groups necessary for forming a benzene ring having substituent(s) having a Hammett's sigma constant of −0.2 to +0.7 and thus a relatively weak electron donating property, and among them are further preferable atomic groups for forming a benzene ring substituted by halogen atom(s), i.e. F, Cl, Br or I.

Linking groups represented by L represent substituted or unsubstituted methine groups, or linking groups formed by linkage of 3, 5 or 7 substituted or unsubstituted methine groups through conjugated double bonds. Particularly preferred among these linking groups are those represented by the general formulae (a) to (i):

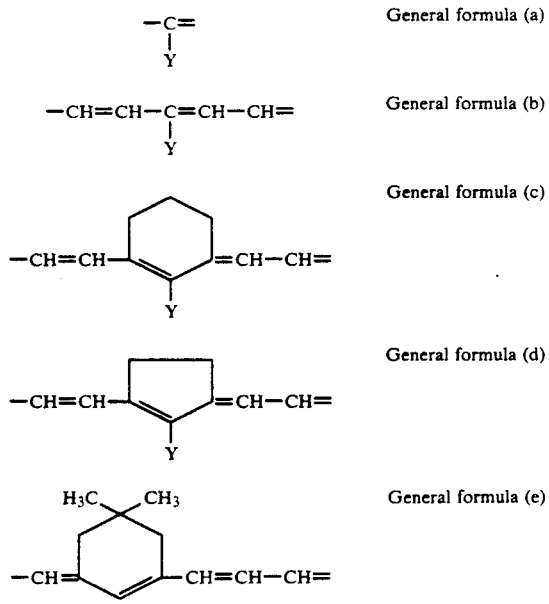

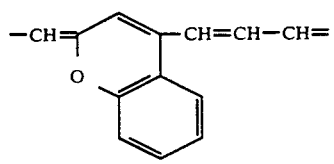

General formula (f)

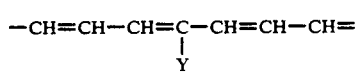

General formula (g)

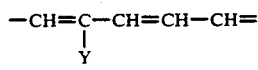

General formula (h)

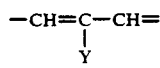

General formula (i)

In the general formulae (a) to (i), Y represents a hydrogen atom or a monovalent group. Preferred examples of the monovalent group include lower alkyl groups such as a methyl group, substituted or unsubstituted phenyl groups, aralkyl groups such as a benzyl group, lower alkoxy groups such as a methoxy group, disubstituted amino groups such as dimethylamino, diphenylamino, methylphenylamino, morpholino, imidazolidino and ethoxycarbonylpiperazino groups, alkylcarbonyloxy groups such as an acetoxy group, alkylthio groups such as a methylthio group, a cyano group, a nitro group, halogen atoms such as F, Cl and Br, etc.

Particularly preferred among the linking groups represented by L are linking groups necessary for forming di- or tricarbocyanine dyes, and specifically include those represented by the general formulae (b), (c), (d), (e), (f), (g) and (h).

An anion represented by $X^-$ is for supplying a negative charge necessary for the neutralization of the charge of the cation part, and is a monovalent or divalent ion.

Examples of anions represented by $X^-$ include halogen ions such as $Cl^-$, $Br^-$ and $I^-$, $SO_4^-$, $HSO_4^-$, alkyl sulfate ions such as $CH_3OSO_3^-$, sulfonate ions such as a paratoluenesulfonate ion, a naphthalene-1,5-disulfonate ion, a methanesulfonate ion, a trifluoromethanesulfonate ion and an octanesulfonate ion, carboxylate ions such as an acetate ion, a p-chlorobenzoate ion, a trifluoroacetate ion, an oxalate ion and a succinate ion, $PF_6^-$, $BF_4^-$, $ClO_4^-$, $IO_4^-$, a tungstate ion, heteropolyacids ion such as a tungstophosphate ion, $H_2PO_4^-$, $NO_3^-$, a phenolate ion such as a picrate ion, etc.

Preferred among the anions represented by $X^-$ include $Cl^-$, $Br^-$, $I^-$, $CH_3OSO_3^-$, $C_2H_5OSO_3^-$, a paratoluenesulfonate ion, a p-chlorobenzenesulfonate ion, a methanesulfonate ion, a butanesulfonate ion, a naphthalene-1,5-disulfonate ion, perfluorosulfonate ions such as a trifluoromethanesulfonate ion, $PF_6^-$, $BF_4^-$, $ClO_4^-$, etc. Particularly preferred among the anions are a trifluoromethanesulfonate ion, $PF_6^-$ and $ClO_4^-$, and most preferred among them are a trifluoromethanesulfonate ion and $PF_6^-$ in view of no anxiety of explosion.

Particularly preferred dyes for optical information recording media suitable for readout by CD players are dyes represented by the general formula (I) wherein L is a linkage group formed by linking five optionally substituted methine groups through conjugated double bonds. By use of such a compound in the recording layer, an information recording medium can be obtained which has an extremely high reflectance of 70% or more against a plane flat.

That is, in optical information recording media of the invention having an extremely high sensitivity, writing of EFM signals is possible by an irradiation power of 10 mW or less, and a reflectance of 60% or more against a plane flat can be realized, and thus readout by commercially available CD players is possible. Therefore, optical information recording media of the present invention can be used as DRAW type CD.

In the optical information recording medium of the present invention, a reflectance of at least one point of the wavelength region of 750 to 850 nm is 60% or more.

Specific examples of compounds represented by the general formula (I) and used in the present invention are mentioned below, but the scope of the present invention should not be limited thereto.

1.

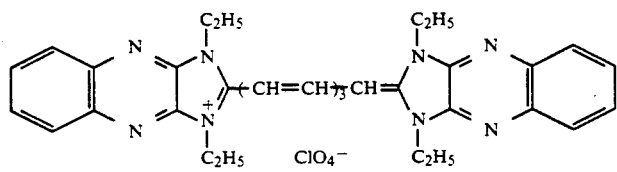

2.

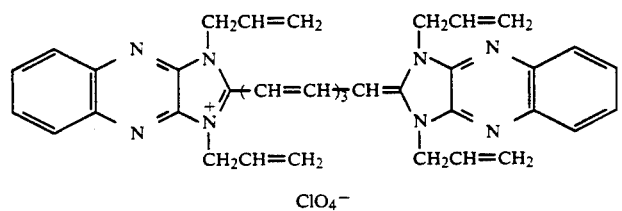

3.

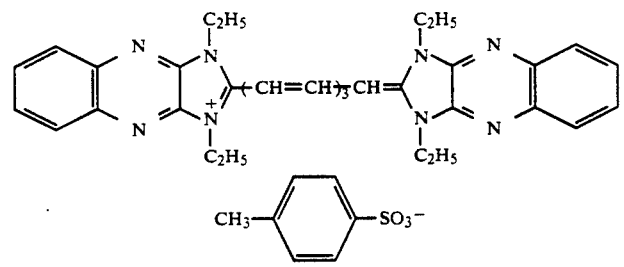

4.

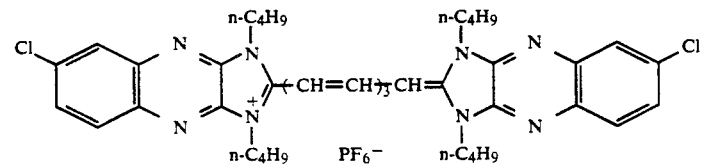

-continued
5.
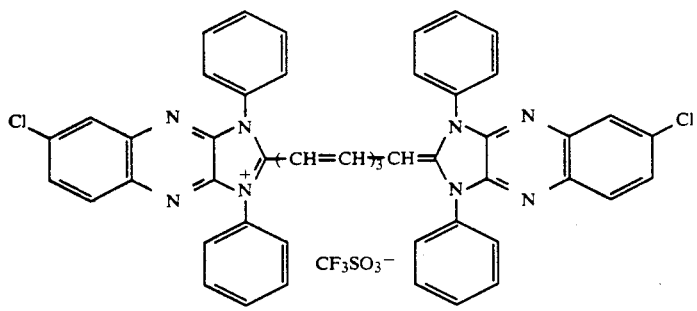
6.
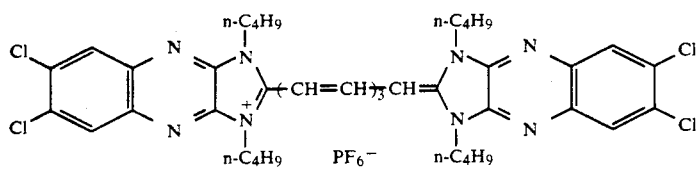
7.
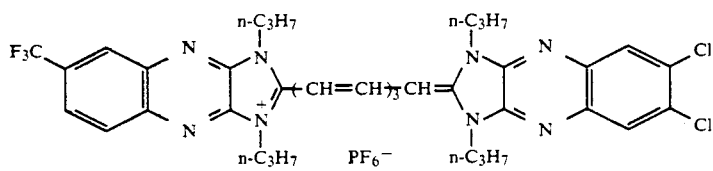
8.
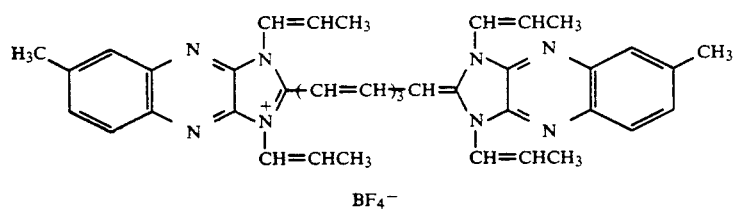
9.
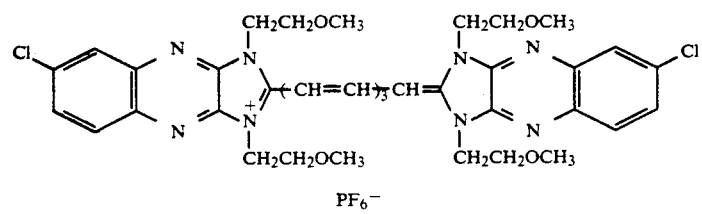

10.
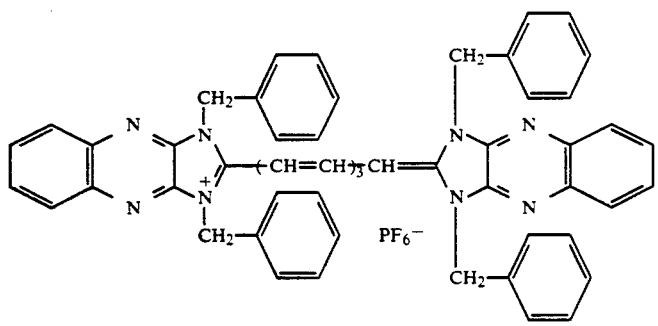
11.
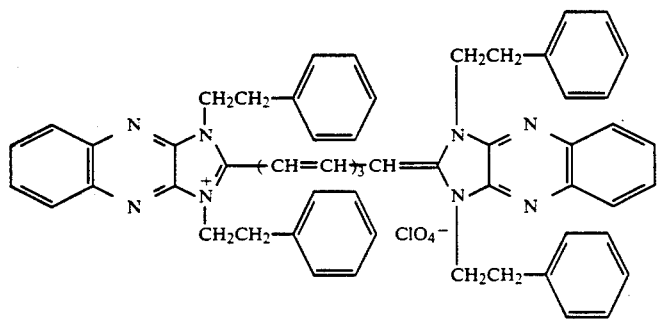
12.
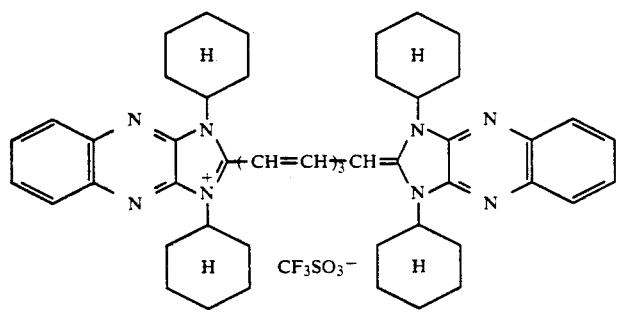
13.
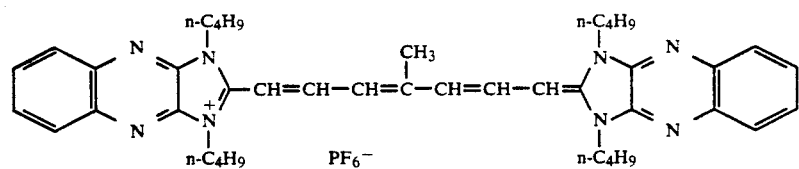
14.
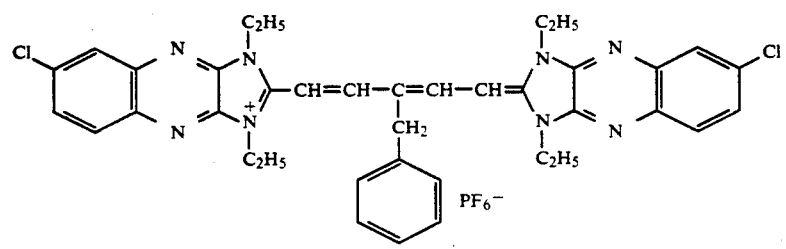

15.
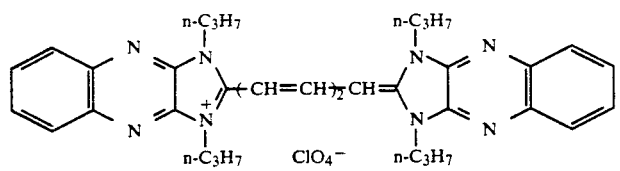
16.
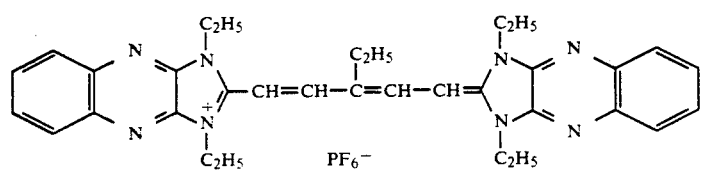
17.
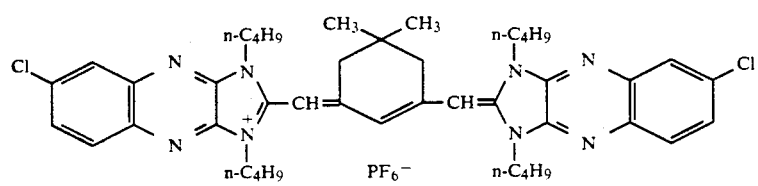
18.
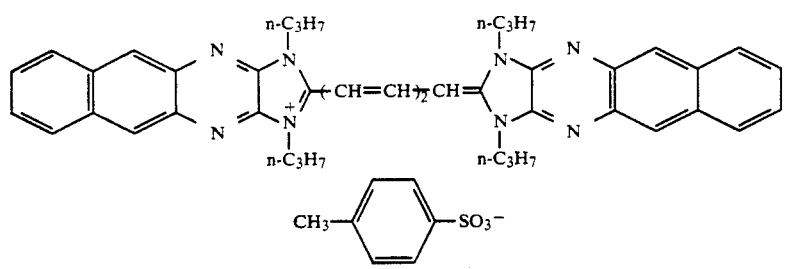
19.
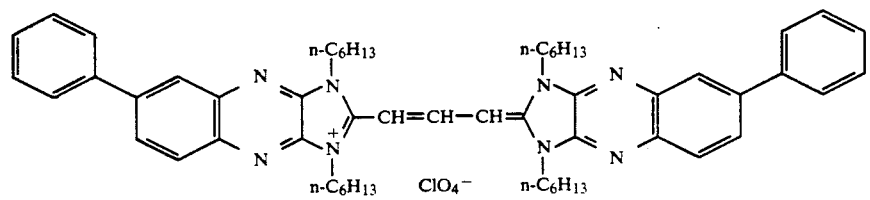

-continued
20.
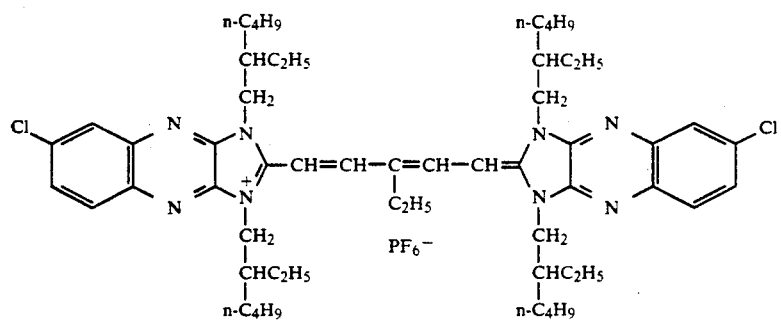
21.
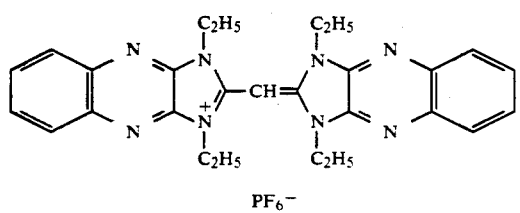
22.
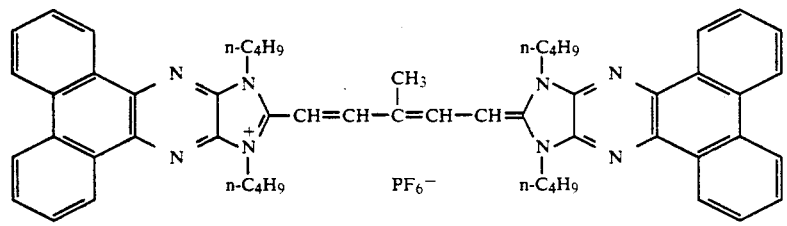
23.
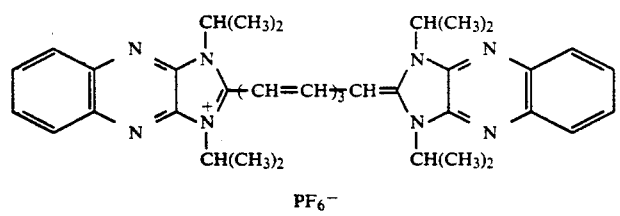
24.
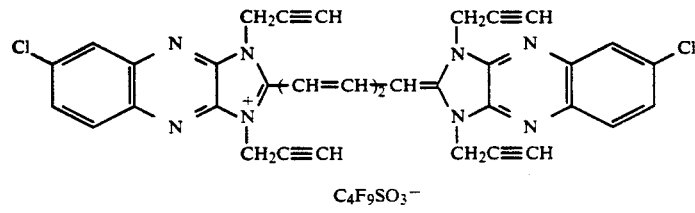

25.
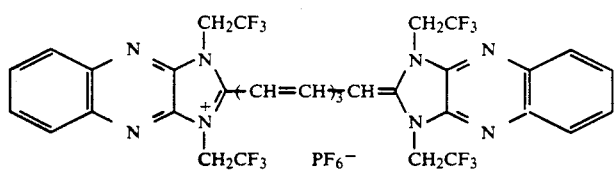
26.
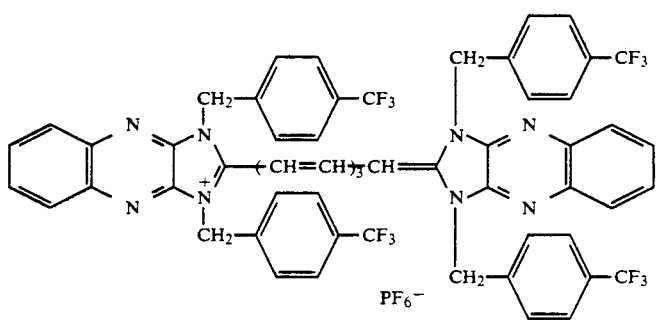
27.
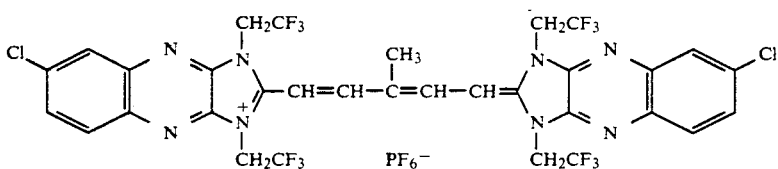
28.
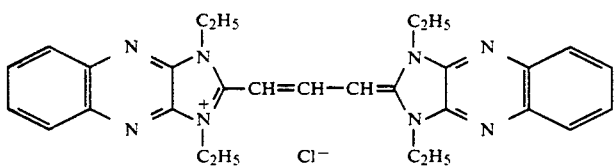
29.
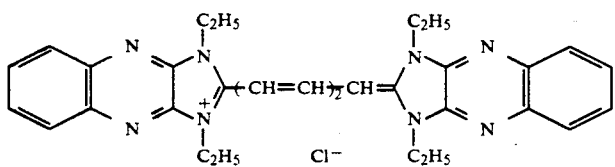
30.
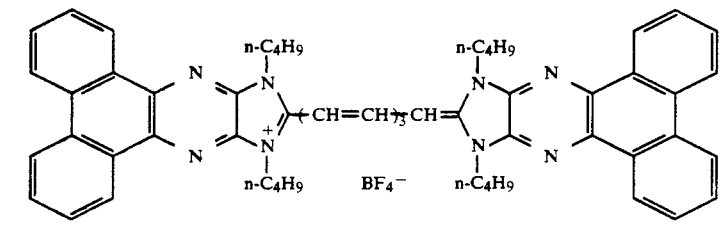

31.
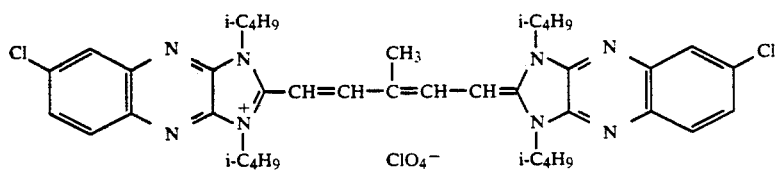

32.
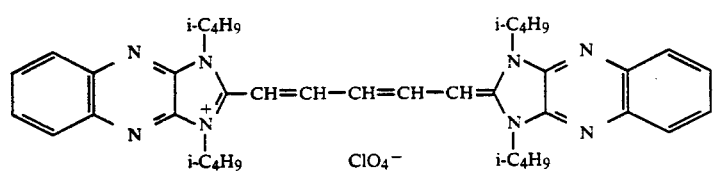

33.
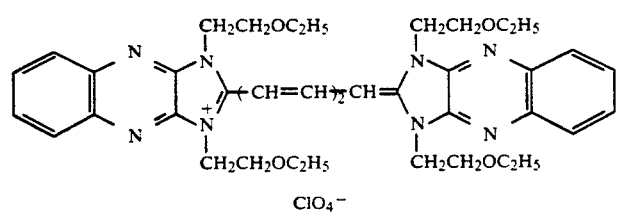

34.
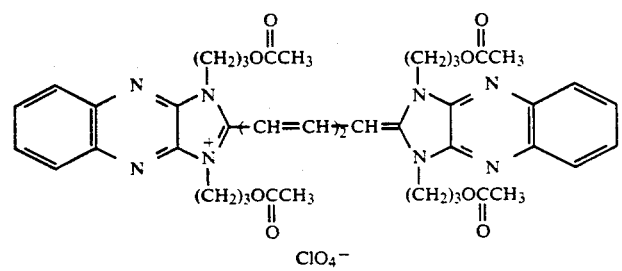

35.
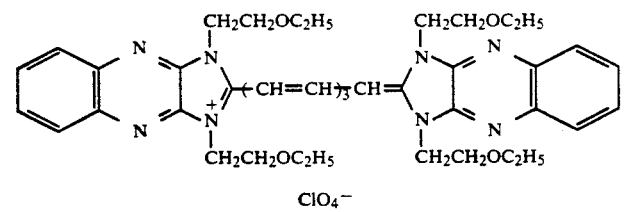

A compound represented by the general formula (I) of the present invention can be synthesized, for example, according to the method disclosed in U.S. Pat. No. 3,431,111, namely by reacting an imdazoquinoxaline derivative represented by the following general formula (A) with a methine source such as an orthoformic ester, a trimethine source such as tetramethoxypropane, or a pentamethine source such as a glutacondialdehyde acetal or 1,7-diphenyl-1,7-diaza-1,3,5-heptatriene:

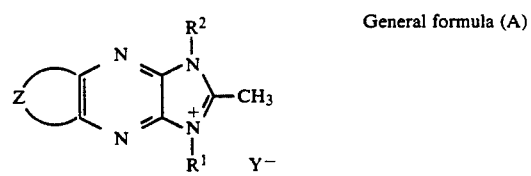

General formula (A)

wherein $R^1$, $R^2$ and Z are the same as defined in the general formula (I), and Y represents an anion.

Examples of a solvent used in the reaction usually include alcohols such as methanol and ethanol, amides such as N,N-dimethylformamide, ethers such as tetrahydrofuran, heteroaromatic compounds such as pyridine and picoline. Addition of sodium acetate, a base such as triethylamine, acetic anhydride or the like in the reaction sometimes accelerate the reaction.

Synthetic examples of compounds represented by the general formula (I) are described below.

SYNTHETIC EXAMPLE 1

Synthesis of Compound 2

1,7-Diphenyl-1,7-diaza-1,3,5-heptatriene hydrochloride (2.8 g) and 20 ml of pyridine were added to 8.6 g of 1,3-diallyl-2-methylimidazo[4,5-6]quinoxalinium paratoluenesulfonate and heated to make a solution. After addition of 2 ml of acetic anhydride, the mixture was refluxed for 10 minutes. After the reaction solution was cooled to room temperature, ethyl acetate was added, and the insoluble matters were collected and washed with ethyl acetate. Methanol was added to the insoluble matters for washing, and deposited crystals having metal luster were collected by filtration. The crystals were dissolved in methanol, and an aqueous 60% perchloric acid solution was added thereto to deposit a perchlorate salt of the dye, which was collected by filtration, washed with methanol and dried.

Yield 0.6 g, m.p. 224.5°–226° C.

SYNTHETIC EXAMPLE 2

Synthesis of Compound 28

1,3-diethyl-2-methylimidazo[4,5-b]quinoxalinium chloride (2.8 g) and 1.5 g of diethoxymethyl acetate were added to 10 ml of pyridine, and the mixture was refluxed for 10 minutes. After cooling of the reaction mixture, the formed solid was collected by filtration and washed with ethanol. The solid was twice recrystallized from ethanol to obtain 0.7 g of Compound 28.

M.p. 249°–252° C.

SYNTHETIC EXAMPLE 3

Synthesis of Compound 29

1,3-Diethyl-2-methylimdazo[4,5-b]quinoxalinium chloride (2.8 g) and 1.6 g of 1,1,3-trimethoxypropene were added to 10 ml of pyridine, and the mixture was refluxed for 10 minutes. After cooling, the reaction mixture was filtered and the resulting solid was washed with ethanol. This solid was twice recrystallized from ethanol to obtain 0.9 g of Compound 29.

M.p. 230°–232° C.

SYNTHETIC EXAMPLE 4

Synthesis of Compound 32

To 24 g of 1,3-diisobutyl-2-methylimidazo[4,5-b]quinoxalinium p-toluenesulfonate was added 100 ml of pyridine, followed by heating to dissolve it. Then, 25 ml of 1,1,3,3-tetramethoxypropane was added thereto and the mixture was stirred with heating for one hour. Crystals formed after leaving it to cool were collected by filtration and washed with methanol to obtain 14 g of a crude dye. 600 ml of Methanol was added to 8 g of this dye and the insoluble matters were removed by filtration. A solution of 5 g of tetrabutylammonium perchlorate in 50 ml of methanol was added to the filtrate, and the resulting crystals were collected by filtration and washed with methanol to obtain 4 g of 2-[5-(1,3-diisobutylimidazo[4,5-b]quinoxalin-2-ylidene)-1,3-pentadienyl]-1,3-diisobutylimidazo[4,5-b]quinoxalinium perchlorate. The compound has a melting point of 286° C. (decomposition) and an absorption maximum wavelength of 692 nm in methanol.

SYNTHETIC EXAMPLE 5

Synthesis of Compound 33

To 5 g of 1,3-bis(2-ethoxyethyl)-2-methylimidazo[4,5-b]quinoxalinium p-toluenesulfonate was added 19 ml of pyridine, followed by heating for dissolution. Then, 4.7 ml of 1,1,3,3-tetramethoxypropane was added thereto and the mixture was stirred with heating for one hour. After cooling to room temperature, 100 ml of methanol was added and a solution of 4 g of tetrabutylammonium perchlorate in 20 ml of methanol was further added thereto. The resulting crystals were collected by filtration, washed with methanol and dried. Yield 1.6 g, melting point 215°–216° C., absorption maximum wavelength (methanol solution) 690 nm.

SYNTHETIC EXAMPLE 6

Synthesis of Compound 34

To 3 g of 1,3-bis(3-acetoxypropyl)-2-methylimidazo[4,5-b]quinoxalinium p-toluenesulfonate was added 12 ml of pyridine, followed by heating for dissolution. Then, 2.9 ml of 1,1,3,3-tetramethoxypropane was added and the mixture was stirred with heating for one hour. After cooling to room temperature, 60 ml of methanol was added and a solution of 3 g of tetrabutylammonium perchlorate in 20 ml of methanol was added thereto. The resulting crystals were collected by filtration, washed with methanol and dried. Yield 0.7 g, melting point 171°–181° C., absorption maximum wavelength (methanol solution) 688 nm.

In optical information recording media of the present invention, dyes represented by the general formula (I) may be used alone or in combination of two or more, or may be used together with dyes other than dyes of the present invention. Further, it is also effective to use various antioxidants or singlet oxygen quenchers together therewith for enhancement of reading durability. Further, various resins may also be used together.

It is also possible to increase reading durability by forming chelate compounds with dyes of the general formula (I) by addition of transition metal ions.

Various quenchers may be used in the present invention, but preferred ones are transition metal complexes which lower deterioration by readout and have good compatibility with dyes. Preferred center metals are Ni, Co, Cu, Pd, Pt and the like.

Examples of novel quenchers which may be used in the invention include quenchers represented by the formula (II) and (III) disclosed in J.P. KOKAI No. 62-174741:

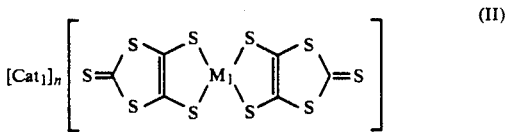

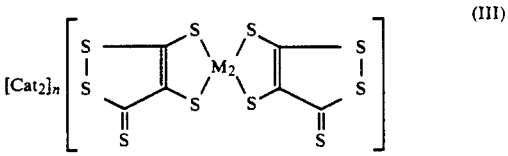

wherein [Cat₁] and [Cat₂] represent cations necessary for making the respective complexes neutral, $M_1$ and $M_2$ represent nickel, copper, cobalt, palladium or platinum, and n represents 1 or 2.

Examples of an inorganic cation in the cation represented by [Cat₁] or [Cat₂] in the aforesaid general formula (II) or (III) include alkali metal ions such as Li⁺, Na⁺ and K⁺, alkaline earth metal ions such as $Mg^{2+}$, $Ca^{2+}$ and $Ba^{2+}$.

Further, examples of an organic cation therein include quaternary ammonium ions and quaternary phosphonium ions.

Preferred cations among the above cations [Cat₁] and [Cat₂] are those represented by the following general formula (IV-a), (IV-b), (IV-c), (IV-d) or (IV-e):

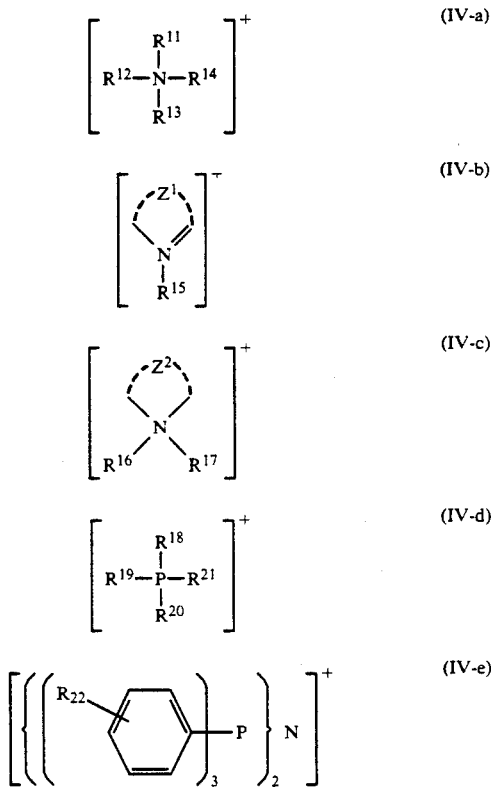

wherein $R^{11}$, $R^{12}$, $R^{13}$, $R^{14}$, $R^{15}$, $R^{16}$, $R^{17}$, $R^{18}$, $R^{19}$, $R^{20}$, $R^{21}$ and $R^{22}$ independently represent a substituted or unsubstituted alkyl group having 1 to 20 carbon atoms, or a substituted or unsubstituted aryl group having 6 to 14 carbon atoms, and $Z^1$ and $Z^2$ independently represent a nonmetal atomic group which forms 5-membered or 6-membered ring together with a nitrogen atom in each formula.

The above substituted or unsubstituted alkyl group having 1 to 20 carbon atoms includes, for example a methyl group, an ethyl group, a n-butyl group, an isoamyl group, a n-dodecyl group and n-octadecyl group. The aryl group having 6 to 14 carbon atoms include, for example a phenyl group, a tolyl group and an α-naphthyl group.

These alkyl groups and aryl groups may respectively be substituted with a cyano group, a hydroxyl group, an alkyl group having 1 to 20 carbon atoms (e.g., a methyl group, an ethyl group, an n-butyl group or an n-octyl group), an aryl group having 6 to 14 carbon atoms (e.g., a phenyl group, a tolyl group or an α-naphthyl group), an acyloxy group having 2 to 20 carbon atoms (e.g., an acetoxy group, a benzoyloxy group or p-methoxybenzoyloxy group), an alkoxy group having 1 to 6 carbon atoms (e.g., a methoxy group, an ethoxy group, a propoxy group or a butoxy group), an aryloxy group (e.g., a phenoxy group or a tolyloxy group), an aralkyl group (e.g., a benzyl group, or a phenethyl group), an alkoxycarbonyl group (e.g., a methoxycarbonyl group, an ethoxycarbonyl group or an n-butoxycarbonyl group), an aryloxycarbonyl group (e.g., a phenoxycarbonyl group or a tolyloxycarbonyl group), an acyl group (e.g., an acetyl group or a benzoyl group), an acylamino group (e.g., an acetylamino group or a benzoylamino group), a substituted or unsubstituted carbamoyl group (e.g., an N-ethycarbamoyl group or an N-phenylcarbamoyl group), an alkylsulfonylamino group (e.g., a methylsulfonylamino group), an arylsulfonylamino group (e.g., a phenylsulfonylamino group), an alkylsulfamoyl group (e.g., an N-ethylsulfamoyl group), an arylsulfamoyl group (e.g., an N-phenylsulfamoyl group), an alkyl- or arylsulfonyl group (e.g., a mesyl group or a tosyl group) or the like.

$Z^1$ and $Z^2$ independently represent a nonmetal atomic group necessary for forming a 5-membered ring or a 6-membered ring as aforesaid. The 5-membered ring or 6-membered ring may include a pyridine ring, an imidazole ring, a pyrrole ring, a 2-pyrroline ring, a pyrrolidine ring, a piperidine ring, a pyrazole ring, a pyrazoline ring, an imidazoline ring and the like.

Cations represented by the general formula (IV-b) may include, for example, a dodecylpyridinium group, a hexadecylpyridinium group and a dodecylimidazolium group. Cations represented by the general formula (IV-c) may include; for example, an N-ethyl-N-hexadecylpiperidinium group, an N-ethyl-N-dodecylpyrazolidinium group.

Cations preferably used in the present invention among cations represented by the above general formulae (IV-a), (IV-b), (IV-c), (IV-d) and (IV-e) and (IV-a), (IV-b), (IV-d) and (IV-e) in view of availability of the raw materials and preparation cost.

The kind of these cations [Cat₁] and [Cat₂] has influence on the solubilities of the compounds represented by the aforesaid general formula (II) or (III) in organic solvents.

In general, when substituents linking to the quaternary hereto atom are alkyl groups, solubility of the compound increases as the chain lengths of the alkyl groups become longer. This tendency is remarkable in case of tetraalkyl substituted ammonium or tetraalkyl substituted phosphonium, and cations having a total carbon number of 17 or more in case of ammonium cations and cations having a total carbon number of 4 or more in case of phosphonium cations each bestow high solubilities on the compounds.

Enumeration of $M_1$ or $M_2$ in the compounds represented by the aforesaid general formula (II) or (III) in order of preference is nickel, cobalt, copper, palladium and platinum.

The metal complexes of the general formula (II) or (III) have stereostructures of plane four coordination. Though it cannot be definitely determined whether the thioketone groups in the compounds of the general formula (III) exist symmetrically or unsymmetrically in relation to the center metal, the thioketone groups are represented for convenience's sake as in the general formula (III) in the present specification.

The compounds represented by the aforesaid general formula (II) or (III) may be synthesized as follows.

A compound of the general formula (II) (n=2): Disodium 1,3-dithiol-2-thione-4,5-dithiolate obtained by reacting carbon disulfide with sodium is converted to the zinc complex, and benzoyl chloride is reacted with the complex to form a bisbenzoylthio compound. After decomposition with an alkali, the bisbenzoylthio compound is reacted with a metal salt to obtain the captioned compound.

Further, a compound of the general formula (II) (n=1) may be obtained by oxidizing a complex obtained as above-described (n=2) with a proper oxidizing agent.

A compound of the general formula (III) (n=2): First, disodium 1,3-dithiol-2-thione-4,5-dithiolate obtained by reaction of carbon disulfide with sodium is heated to about 130° C. to isomerize it to disodium 1,2-dithiol-3-thione-4,5-dithiolate. Then, this dithiolate is converted to a zinc complex, and benzoyl chloride is reacted with the zinc complex to form a bisbenzoylthio compound, which is then decomposed with an alkali and reacted with a metal salt to obtain the captioned compound.

A compound of the general formula (III) (N=1) may be obtained by oxidizing a complex obtained as above-described (N=2) with a proper oxidizing agent.

Further, the 1,3-dithiol-2-thione-4,5-dithiolate anion which is an intermediate for obtaining a compound of the general formula (II) or (III) may also be obtained by electrochemical reduction besides the Na-reduction method described above.

Preferred compounds among those represented by the aforesaid general formulae (II) are illustrated as:

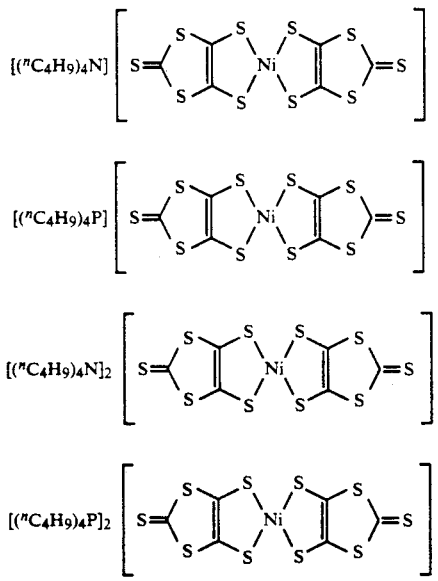

Synthetic examples of compounds represented by the general formula (II) are described as follows:

SYNTHETIC EXAMPLE 7

Synthesis of exemplified compound (II-4)

(1-1) Synthesis of bis(tetraethylammonium)bis(1,3-dithiol-2-thione-4,5-dithiolate)zinc complex All reaction procedures were conducted under an argon atmosphere. 23 g of sodium was cut into small pieces and dispersed in 180 ml of carbon disulfide, followed by dropwise addition in a slow speed of 200 ml of dimethylformamide thereto with stirring. During the dropwise addition, caution should be given so that the mixture does not rapidly generate heat. After the dropwise addition of dimethylformamide, the mixture was gently heated with caution and refluxed for 24 hours. After completion of the reaction of the unreacted sodium was removed by filtration. Then, 50 ml of ethanol was added to the filtrate, and the mixture was stirred at room temperature for 2 hours. Carbon disulfide was distilled away from this solution at room temperature under reduced pressure. Then, 300 ml of water was slowly added dropwise thereto and the resulting solution was filtered.

Separately in advance, 20 g of zinc chloride was dissolved in 500 ml of methanol and 500 ml of concentrated ammonia water was added thereto to prepare a solution. This solution was added to the above filtrate at room temperature. After stirring for 5 minutes, an aqueous solution of 53 g of tetraethylammonium bromide in 250 ml of water was added to the mixture to immediately form a red precipitate, which was recovered by filtration and air-dried to obtain the captioned zinc complex.

(1-2) Synthesis of 4,5-bis(benzoylthio)-1,3-dithiol-2-thione 22 g of the zinc complex obtained in (1-1) was dissolved in 500 ml of acetone and filtered. 150 ml of benzoyl chloride was added to the filtrate with stirring to form immediately a yellow precipitate. The precipitate was recovered by filtration, washed with water and air-dried to obtain 16 g of the captioned compound.

(1-3) Synthesis of exemplified compound (II-4)

9.2 g of the bis(benzoylthio) compound obtained in (1-2) was dissolved in 50 ml of methanol. Then, 6.3 g of a 28% methanol solution of sodium methoxide was added thereto, followed by stirring for 10 minutes. To this solution was added a solution of 2.4 g of nickel chloride hexahydrate in 50 ml of methanol, and the mixture was stirred at room temperature for 30 minutes. To the resulting solution was added a solution of 8.5 g of tetrabutylphosphonium bromide in 100 ml of methanol to form immediately a black precipitate. The mixture was stirred for additional 20 minutes and filtered. The solid was washed with acetone, air-dried and recrystallized from acetone-isopropyl alcohol to obtain the captioned compound. Yield 3.8 g.

SYNTHETIC EXAMPLE 8

Synthesis of exemplified compound (II-2)

1 g of the nickel complex obtained in (1-3) was dissolved in 60 ml of acetone, and 30 ml of acetic acid was added thereto. The mixture was stirred for 3 hours and the solvent was distilled away to form black crystals, which was then recrystallized from acetone-methanol to obtain the desired exemplified compound (II-2). Yield 0.4 g, M.P. 185° C., λmax: 1125 nm, εmax: $2.51 \times 10^4$ (in $CH_2Cl_2$)

Examples of known quenchers which may be used in the invention include the following compounds disclosed in J.P. KOKAI No. 59-178295.

(i) Bisdithio-α-di-ketones

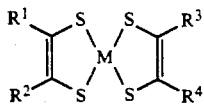

wherein $R^1$ to $R^4$ independently represent an alkyl group or an aryl group, and M represents a divalent transition metal atom.

(ii) Bisphenyldithiols.

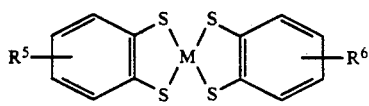

wherein $R^5$ and $R^6$ independently represent an alkyl group or a halogen atom, and M represents a divalent transition metal atom.

(iii) Acetylacetonate chelates
(iv) Dithiocarbamic acid chelates
(v) Bisphenylthiols
(vi) Thiocatechol chelates
(vii) Salicylaldehyde oximes
(viii) Thiobisphenolate chelates
(ix) Phosphonous acid chelates
(x) Benzoates
(xi) Hindered amines
(xii) Transition metal salts Besides the above compounds, a compound containing an aminium or diimonium ion represented by the following formula may also be used in the invention as known quenchers.

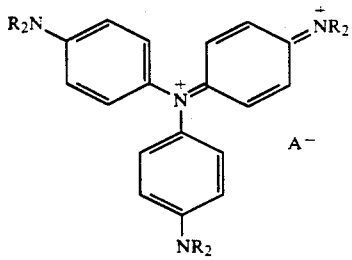

wherein R represents an alkyl group or an aryl group and A represents an anion. Specific examples thereof include IRG-002, IRG-003, IRG-022, and IRG-023 each manufactured by NIPPON KAYAKU CO., LTD.

A linkage compound of a cation of a dye of the general formula (I) to an anion of a quencher may also be used in the invention.

A quencher is generally used in an amount of 0.05 to 12 moles, preferably 0.1 to 1.2 moles per 1 mole of dye(s) of the general formula (I).

Though a quencher is preferably contained in the dye thin film recording layer, it may be contained in a layer different from the recording layer. It is possible to provide a subbing layer on the support, a protective layer on the recording layer, and/or a reflective layer on the support or on the recording layer in the optical information recording medium of the invention.

Known supports may optionally be used as a support. Typical examples thereof are glasses and plastics such as acryls, polycarbonates, polysulfones, polyimides, amorphous polyolefins, epoxy resins, polyesters and the like. The support may be used in various shapes such as disc-like, card-like, sheet-like and roll film-like shapes.

Groove may be formed on the glass or plastic support in order to make tracking during recording easy. Further, a subbing layer of a plastic binder, or an inorganic oxide, an inorganic sulfide or the like may be provided on the glass or plastic support. A subbing layer having a thermal conductivity lower than that of the support is preferable. Further, it is also possible to make two recording media facing with each other so that both recording layers are inside, namely to make two recording media so-called air sandwich structure.

The recording layer in the present invention may be formed, for example, by dissolving dye(s) represented by the general formula (I) and a quencher in an organic solvent (for example, methanol, ethanol, isopropyl alcohol, a fluorinated alcohol such as 2,2,3,3-tetrafluoropropanol, dichloromethane, dichloroethane or acetone), and, if necessary, adding a proper binder (for example, PVA, PVP, polyvinyl butyral, polycarbonate, nitrocellulose, polyvinyl formal, methyl vinyl ether, chlorinated paraffin, maleic anhydride copolymer, styrene-butadiene copolymer or xylene series resin), and applying the solution (for example by spin coating) onto a support. The recording layer may also be formed by codepositing dye(s) of the general formula (I) and a quencher on a support, or by vacuum-depositing dye(s) of the general formula (I) and then applying a quencher. When a binder is used, it is preferable to use it in an amount of 0.01 to 2 times the weight of the dye. Further, it is also possible to form a thin film according to Langmuir-Blodgett's technique using dye(s) of the general formula (I).

The most effective method for formulation of the recording layer with high reflectivity is spin coating by use of a solvent containing 95 v/v % or more 2, 2, 3, 3-tetrafluoropropanol. The dye concentration in the solution for the spin coating is preferably 5 to 75 g/l, more preferably 10 to 35 g/l.

The number of rotation of the spin coater is preferably 50 to 8000 rpm, more preferably 200 to 5000 rpm and may be changed within the preferred range during the time after the coating solution is coated on the substrate and before it is dried.

It is possible to provide one or more of the recording layers in the present invention.

An antioxidant or a fading inhibitor may be contained in the recording layer or a layer adjacent thereto in order to inhibit deterioration of the dye.

Film thickness of the recording layer is usually in the range of 0.01 to 2 μm, preferably in the range of 0.02 to 0.8 μm.

When a layer for reflecting a semiconductor laser, an He-Ne laser or the like is provided, the optical information recording medium of the present invention may be made either by providing a reflecting layer on a support and then providing a recording layer on the reflecting layer in such a manner as aforementioned, or by providing a recording layer on a support and then providing a reflecting layer thereon.

The reflecting layer may be provided in such a manner as described below besides a sputtering method, an ion plating method or the like.

For example, a solution which is prepared by dissolving a metal salt or a metal complex salt in a water soluble resin (PVP, PVA or the like) and further adding a reducing agent thereto is applied onto a support and the resulting support is dried with heating at 50° to 150°

C., preferably 60° to 100° C., whereby a reflecting layer is provided thereon.

The metal salt or the metal complex salt is used in a weight ratio of 0.1 to 10, preferably 0.5 to 1.5 based on the resin. Further, as for the thickness of the recording layer, it is proper that the thickness of the metal particle reflecting layer is in the range of 0.01 to 0.1 μm and that of the light absorption layer is in the range of 0.01 to 1 μm.

Usable metal salts and metal complex salts include silver nitrate, potassium silver cyanide, potassium gold cyanide, silver amine complex, silver cyan complex, gold salt or gold cyan complex and the like. Usable reducing agents include formalin, tartaric acid, a tartrate, a hypophosphite, sodium borohydride, dimethylamine borane and the like. The reducing agent may be used in the range of 0.2 to 10 moles, preferably 0.5 to 4 moles per 1 mole of the metal salt or the metal complex salt.

In the optical information recording medium of the present invention, recording or information is conducted by applying a spot-like high energy beam such as laser (for example, semiconductor laser and He-Ne laser) onto the recording layer through the support or from the opposite side of the support. That is to say, light absorbed in the recording layer is converted to heat and pits are formed in the recording layer.

On the other hand, reading of information is conducted by applying a laser beam with a low power of energy equal to or below the threshold value for recording, and detecting the difference in quantity of reflected light or quantity of transmitted light between pitted areas and unpitted areas.

The recording medium of the present invention is particularly suitable for recording and reading signals in the CD format. The "CD format" is defined as a data format for recording, on a compact disk, digital data or digitized signals of analogue signals such as music signals, and for reading the digital data by using a compact disk player. In other words, the "CD format" is a term which defines the processing of signals by which digital signals are subcoded (e.g., subcodes are inserted to the data so that the beginning part of the music or other data can easily be detected) and encoded so as to be recorded on the disk. In order to carry out the processing, it may be preferable to input digital signals to an encoder commercially available, to use the output of the encoder to modulate a laser, and to record the data on the disk by using the modulated laser.

In order to read out the information recorded according to the CD format, it is necessary that the recorded medium has at least 60% light reflectance at 780 nm.

It is therefore required that an optical information recording medium which can be used for recording and reading CD format signals have a reflectance of at least 60% at 780 nm, that it can produce a series of changes on the recording layer upon on/off irradiation of a laser beam while the medium is rotated at a constant linear speed of 1.2 to 1.4 m/sec, and that it is so resistant that the laser beam used for reading out the recorded information cannot erase the recorded information or cause any new changes on non-recorded areas.

The recording medium of the present invention has reflectance of at least 60% at 780 nm without a metal reflective layer so that it is very convenient for recording and reading information in the CD format mentioned above.

The characteristic properties described above have not been attained by the prior art optical information recording medial in which cyanin dyes having imidazoquinoxaline nuclei are used. These characteristics have first been realized by the optical information recording media of the present invention in which dyes of the general formula (I) are used.

The present invention is further explained in detail below according to examples, but the scope of the present invention should not be limited thereto.

EXAMPLE 1

Dye, quencher and an optional binder represented in Table 1 were dissolved in a mixed solvent of methanol, methyl ethyl ketone, dichloroethane and 2,2,3,3-tetrafluoropropanol in a proper mutual ratio. A surface-hardened polycarbonate support with a groove (pitch 1.6 μ, depth 750 Å) was coated with the solution to a thickness of 0.1 μm using a spinner, and dried. Weight ratio of the dye to the quencher was 3:1, and in case of using a binder, the weight thereof was 1/5 of the dye.

The following evaluation conditions were applied. The results are shown in Table 1.

Recording and readout

Laser : Semiconductor laser (GaAlAs)
Wavelength of laser :-780 nm
Beam size of laser 1.6 μm
Line speed : 5 m/s
Recording power : 8 mW
Recording frequency : 2.5 MHz
Recording duty : 50%
Readout power : 0.4 mW Evaluation of readout deterioration Readout power : 1.0 mW
Readout number : $10^5$ times Evaluation of deterioration during preservation Preservation temperature and humidity: 60° C., 90%RH
Preservation time : 30 days

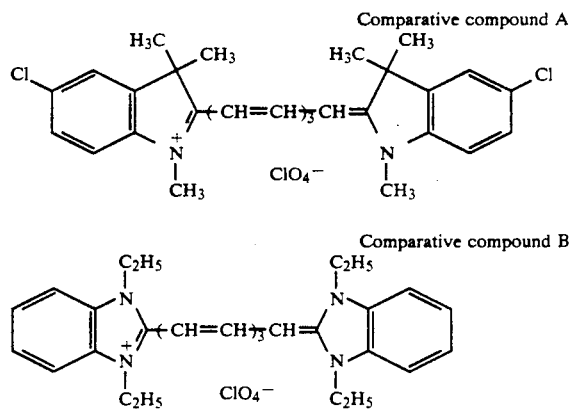

TABLE 1

| Sample No. | Dye | Quencher | Binder | C/N (dB) | After forced deterioration test C/N (dB) 60° C., 90% RH, 3 days | After forced deterioration test C/N (dB) Continuous readout (0.8 mW) | Note |
| --- | --- | --- | --- | --- | --- | --- | --- |
| 1 | A | — | — | 54 | 45 | 42 | Comparative example |
| 2 | " | II-(2) | — | 52 | 45 | 48 | " |
| 3 | " | — | Nitrocellulose | 53 | 46 | 42 | " |
| 4 | " | II-(4) | Chlorinated paraffin | 52 | 46 | 48 | " |
| 5 | B | — | — | 48 | 39 | 39 | " |
| 6 | " | II-(2) | — | 46 | 39 | 43 | " |
| 7 | " | — | Polystyrene | 46 | 43 | 39 | " |
| 8 | " | II-(4) | Nitrocellulose | 45 | 43 | 43 | " |
| 9 | 1 | — | — | 54 | 51 | 50 | Present invention |
| 10 | " | II-(2) | — | 53 | 49 | 53 | " |
| 11 | " | — | Chlorinated paraffin | 53 | 50 | 49 | " |
| 12 | " | II-(4) | Nitrocellulose | 52 | 49 | 51 | " |
| 13 | 2 | — | — | 54 | 52 | 50 | " |
| 14 | " | II-(2) | — | 52 | 49 | 52 | " |
| 15 | " | — | Polyethy acrylate | 52 | 49 | 49 | " |
| 16 | " | II-(4) | Chlorinated paraffin | 52 | 49 | 50 | " |
| 17 | 4 | — | — | 54 | 52 | 50 | " |
| 18 | " | II-(2) | — | 52 | 50 | 51 | " |
| 19 | " | — | Polyvinyl butyral | 53 | 50 | 49 | " |
| 20 | " | II-(4) | Polyethylene | 52 | 49 | 51 | " |
| 21 | 14 | — | — | 53 | 51 | 50 | " |
| 22 | " | II-(2) | — | 52 | 50 | 51 | " |
| 23 | " | — | Nitrocellulose | 53 | 51 | 50 | " |
| 24 | " | II-(4) | Chlorinated paraffin | 52 | 50 | 51 | " |
| 25 | 16 | — | — | 54 | 51 | 51 | " |
| 26 | " | II-(2) | — | 53 | 49 | 52 | " |
| 27 | " | — | Nitrocellulose | 53 | 52 | 50 | " |
| 28 | " | II-(4) | Polystyrene | 53 | 51 | 52 | " |
| 29 | 32 | — | — | 53 | 52 | 50 | " |
| 30 | 33 | — | — | 54 | 51 | 50 | " |
| 31 | 34 | — | — | 53 | 50 | 50 | " |
| 32 | 35 | — | — | 53 | 51 | 49 | " |

It is seen from the result in Table 1 that information recording media of the present invention have better recording performance and stability than those in the comparative examples.

EXAMPLE 2

The above compound 31 (1.4 g) was dissolved in 100 cc of 2,2,3,3-tetrafluoropropanol to prepare a coating solution for a dye recording layer.

A disc-shaped polycarbonate support provided with a tracking guide (outside diameter 120 mm, inside diameter 15 mm, thickness 1.2 mm, track width 1.0 micrometer, track pitch 1.6 micrometers, groove depth 800 Å) was coated with the above coating solution at a speed of 850 rpm by a spin coat method. The coated support was then dried at a temperature of 70° C. for 10 minutes to form a recording layer having a film thickness of 600 Å.

Thus, information recording medium A comprising the support and the dye recording layer was prepared.

COMPARATIVE EXAMPLE 2

Procedures in Example 2 were repeated except that the indolenine dye (Comparative compound A) which has a high reflectance in usual optical discs was used in place of the above compound 31 to prepare information recording medium B comprising the support and the dye recording layer.

Evaluation of the information recording media

Standard signal (8.15 Hz) in terms of EFM-CD format signal was recorded in each recording layer of the above samples A and B at a recording power of 8.0 mW and a constant linear speed of 1.3 m/sec using a disc evaluation apparatus (Nakamichi Disk evaluation apparatus OMS-1000) and an EFM encoder (KEN-WOOD).

Further, the recorded information was read out at a power of 0.5 mW using a commercially available CD player (Sony, D-50MKII).

As a result, in information recording medium A of the present invention obtained in Example 2 both recording and readout according to the above CD method could be carried out with good accuracy, but on the other hand in information recording medium B of Comparative example 2 (an information recording medium of the prior art) recording could be made but readout was impossible.

The reason is believed to be that since the reflectance of the recording layer (plane part) of Example 2 was 70% at a wavelength of 780 nm whereas the reflectance of the recording layer (plane part) of Comparative example 2 was 30%, the information in information recording medium B obtained in Comparative example 2 could not be read out by using the commercially available CD player as designed on the premise of a reflectance of 60% or more.

Further, information recording medium A obtained in Example 2 was left to stand under an atmosphere of 60° C. and 90% RH for 30 days in order to evaluate its durability, and then subjected to the same read out as above described. As a result, good readout was made. Further, information recording medium A was left to stand for 100 hours and then measured for reflectance using a sunshine weather meter, in order to evaluate weather resistance. As a result, lowering of reflectance was not observed.

EXAMPLE 3

Therefore, it is seen that the information recording medium of the present invention has an enhanced durability in addition to excellent recording and readout characteristics.

Dyes were dissolved in solvents to prepare 1.75% by weight dye solutions which were spin-coated on glass or polycarbonate support with a groove to prepare optical information recording media as shown in Table 2. Reflectance on the plain surface of the recording media at 780 nm and recording and reading out properties are shown in Table 2. As seen in the table, only the combinations of the dyes and the solvent according to the present invention produced the optical information recording medial which are suitable for recording and reading signals in the CD format and the information on the medial can be read out by a conventional compact disk player.

In Table 2, D-142, D-143 and D-144 are dyes disclosed in U.S. Pat. No. 4,713,314 to Namba et al.

dently those having a hydrophobic parameter $\pi$ of $-0.5$ to 15.

3. The optical information recording medium of claim 1 wherein the respective substituents in the definition of $R^1$ and $R^2$ in the general formula (I) are independently halogen atoms, substituted or unsubstituted phenyl groups, alkylthio groups, or substituted or unsubstituted phenylthio groups.

4. The optical information recording medium of claim 1 wherein L in the general formula (I) is represented by the following general formula (b):

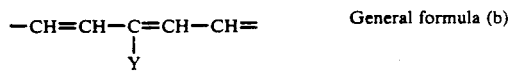

General formula (b)

wherein Y represents a hydrogen atom, a lower alkyl

TABLE 2

| Sample No. | Dye | Solvent | Support | Reflectance at 780 nm (%) | C/N (dB) | Reading out by CD player | Note |
|---|---|---|---|---|---|---|---|
| 33 | 32 | a[1] | PC[3] | 61 | 50 | Yes | This invention |
| 34 | 33 | a | PC | 65 | 51 | Yes | This invention |
| 35 | 34 | a | PC | 64 | 51 | Yes | This invention |
| 36 | 31 | a | PC | — | — | No | comparison[5] |
| 37 | D-142 | a | PC | — | — | No | comparison[5] |
| 38 | D-143 | a | PC | — | — | No | comparison[5] |
| 39 | D-144 | a | PC | — | — | No | comparison[5] |
| 40 | 33 | b[2] | PC | — | — | No | comparison[6] |
| 41 | 33 | b | glass | 32 | 47 | No | comparison |
| 42 | D-144 | b | glass | 28 | 35 | No | comparison |
| 43 | Comparative Compound A | a | PC | 25 | 54 | No | comparison |
| 44 | Comparative Compound A | b | glass | 26 | 46 | No | comparison |
| 45 | Comparative Compound A | b | PMMA[4] | 24 | 51 | No | comparison |
| 46 | 33 + IRG-023 | a | PC | 64 | 48 | Yes | This invention |

[1]a: 2,2,3,3-Tetrafluoropropanol (purity 99.1%)
[2]b: Dichloroethane
[3]PC: Polycarbonate (surface hardened)
[4]PMMA: Polymethylmethacrylate
[5]It was impossible to produce a dye solution due to low solubility of the dye.
[6]The support was dissolved.

What is claimed is:

1. An optical information recording medium for carrying out recording or readout by laser beam which comprises a support having carried thereon a recording layer containing dye(s) represented by the general formula (I):

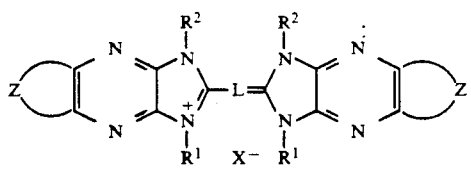

wherein $R^1$ and $R^2$ independently represent substituted or unsubstituted alkyl groups, L represents a linking group formed by linkage of 5 substituted or unsubstituted methine groups through conjugated double bonds, Z represents an atomic group for completing an unsubstituted benzene ring and $X^-$ is a halogen ion, $SO_4^{2-}$, $HSO_4^-$, an alkylsulfate ion, a sulfonate ion, a carboxylate ion, $PF_6^-$, $BF_4^-$, $ClO_4^-$, $IO_4^-$, a tungstate ion, a heteropolyacid ion, $H_2PO_4^-$, $NO_3^-$ or a phenolate ion for neutralization of electron charge of the cationic part wherein the reflectance of the optical information recording medium, at least one point of the wavelength region of 750 to 850 nm, is 60% or more.

2. The optical information recording medium of claim 1 wherein the respective substituents in the definition of $R^1$ and $R^2$ in the general formula (I) are indepengroup, a substituted or unsubstituted phenyl group, an aralkyl group, a lower alkoxy group, a di-substituted amino group, an alkylthio group, a cyano group, a nitro group or a halogen atom.

5. The optical information recording medium of claim 1 which further comprises a quencher.

6. The optical information recording medium of claim 5 wherein the quencher is a compound represented by the general formula (II) or (III):

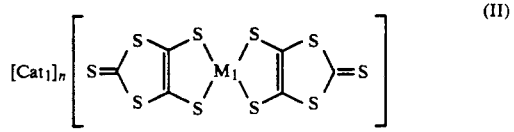

(II)

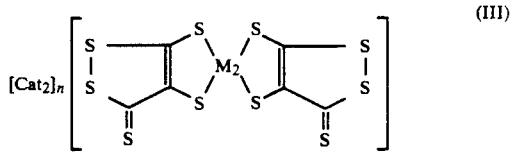

(III)

wherein (Cat$_1$) and (Cat$_2$) represent cations necessary for making the compound neutral, $M_1$ and $M_2$ independently represent nickel, copper, cobalt, palladium or platinum, and n represents 1 or 2.

7. The optical information recording medium of claim 6 wherein (Cat$_1$) and (Cat$_2$) represent an alkali metal ion, an alkaline earth metal ion or $NH_4$.

8. The optical information recording medium of claim 6 wherein (Cat₁) and (Cat₂) are cations represented by one of the general formulae (IV-a) to (IV-e):

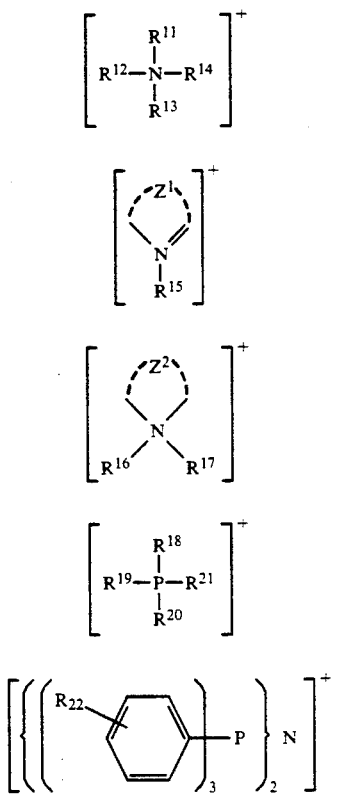

wherein $R^{11}$, $R^{12}$, $R^{13}$, $R^{14}$, $R^{15}$, $R^{16}$, $R^{17}$, $R^{18}$, $R^{19}$, $R^{20}$, $R^{21}$ and $R^{22}$ independently represent substituted or unsubstituted alkyl groups having 1 to 20 carbon atoms, or substituted or unsubstituted aryl groups having 6 to 14 carbon atoms, and $Z^1$ and $Z^2$ independently represent nonmetal atomic groups which form an 5-membered or 6-membered ring together with a nitrogen atom in each formula.

9. The optical information recording medium of claim 8 wherein the substituents of the alkyl group and aryl group in the definition of $R^{11}$ to $R^{22}$ are independently cyano groups. hydroxyl groups, alkyl groups having 1 to 20 carbon atoms, aryl groups having 6 to 14 carbon atoms, acyloxy groups having 2 to 20 carbon atoms, alkoxy groups having 1 to 6 carbon atoms, aryloxy groups, aralkyl groups, alkoxycarbonyl groups, aryloxycarbonyl groups, acyl groups, acylamino groups, substituted or unsubstituted carbamoyl groups, alkylsulfonylamino groups, arylsulfonylamino groups, alkylsulfamoyl groups, arylsulfamoyl groups, alkylsulfonyl groups or arylsulfonyl groups.

10. The optical information recording medium of claim 8 wherein the 5-membered ring or 6-membered ring n the definition of $Z^1$ and $Z^2$ is a pyridine ring, an imidazole ring, a pyrrole ring, a 2-pyrroline ring, a pyrrolidine ring, a piperidine ring, a pyrazole ring, a pyrazoline ring or an imidazoline ring.

11. The optical information recording medium of claim 5 wherein the quencher is selected from the following compounds:

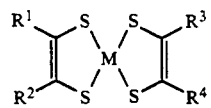

wherein $R^1$ to $R^4$ independently represent alkyl groups or aryl groups, and M represents a divalent transition metal atom, (ii) Bisphenyldithiols

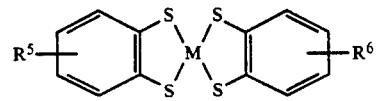

wherein $R^5$ and $R^6$ independently represent alkyl groups or halogen atoms, and M represents a divalent transition metal atom, (iii) Acetylacetonate chelates
(iv) Dithiocarbamic acid chelates
(v) Bisphenylthiols
(vi) Thiocatechol chelates
(vii) Salicylaldehyde oximes
(viii) Thiobisphenolate chelates
(ix) Phosphonous acid chelates
(x) Benzoates
(xi) Hindered amines
(xii) Transition metal salts
(xiii) Aminium or diimonium compounds

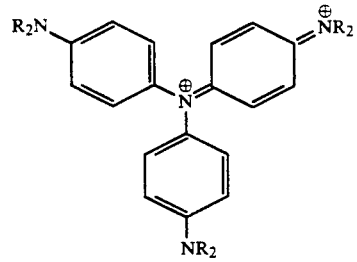

wherein R represents an alkyl group or an aryl group.

12. The optical information recording medium of claim 5 wherein the quencher is present in an amount of 0.05 to 12 moles per 1 mole of the compound of the general formula (I).

13. The optical information recording medium of claim 5 wherein the quencher is contained in the recording layer.

14. The optical information recording medium of claim 1 wherein a subbing layer is provided on the support, a protective layer is provided on the dye thin film recording layer, and/or a reflecting layer is provided on the support or on the recording layer.

15. The optical information recording medium of claim 1 wherein the support is glass or plastic.

16. The optical information recording medium of claim 1 which further comprises a binder in an amount of 0.01 to 2 times the weight of the compound of the general formula (I).

17. The optical information recording medium of claim 1 wherein the film thickness of the recording layer is 0.01 to 2 micrometers.

18. The optical information recording medium of claim 1 wherein the recording medium does not have any metal reflective layer.

19. The optical information recording medium of claim 1 wherein $C^-$ in the general formula (I) is selected from the group consisting of $Cl^-$, $BR^-$, $I^-$, $CH_3OSO_3^-$, $C_2H_5OSO_3^-$, p-toluenesulfonate ion, p-chlorobenzene sulfonate ion, methanesulfonate ion, butanesulfonate ion, naphthalene-1, 5-disulfonate ion, perfluorosulfonate ion, $PF_6^-$, $BF_4^-$ and $CLO_4^-$.

* * * * *